(12) United States Patent
Savage (10) Patent No.: US 6,684,948 B1
(45) Date of Patent: Feb. 3, 2004

(54) APPARATUS AND METHOD FOR HEATING SUBTERRANEAN FORMATIONS USING FUEL CELLS

(76) Inventor: Marshall T. Savage, 5766 Harcourt, Coeur D'Alene, ID (US) 83815

(*) Notice: Subject to any disclaimer, the term of this patent is extended or adjusted under 35 U.S.C. 154(b) by 0 days.

(21) Appl. No.: 10/053,207

(22) Filed: Jan. 15, 2002

(51) Int. Cl.[7] .............................................. E21B 36/04
(52) U.S. Cl. ........................ 166/248; 166/58; 166/60; 166/302
(58) Field of Search ............................ 166/248, 57–60, 166/65.1, 272.1, 302

(56) References Cited

U.S. PATENT DOCUMENTS

| | | |
|---|---|---|
| 2,472,445 A | 6/1949 | Sprong |
| 2,593,477 A | 4/1952 | Newman et al. |
| 2,630,306 A | 3/1953 | Evans |
| 2,630,307 A | 3/1953 | Martin |
| 2,634,961 A | 4/1953 | Ljungstrom et al. |
| 2,732,195 A | 1/1956 | Ljungstron |
| 2,780,449 A | 2/1957 | Fisher et al. |
| 2,780,450 A | 2/1957 | Ljungstrom |
| 2,801,089 A | 7/1957 | Scott, Jr. |
| 2,841,375 A | 4/1958 | Salomonsson |
| 2,874,777 A | 2/1959 | Tadema |
| 2,906,337 A | 9/1959 | Hennig |
| 2,914,309 A | 11/1959 | Saiomonsson et al. |
| 2,923,535 A | 2/1960 | Ljungstrom et al. |
| 3,017,168 A | 1/1962 | Carr |
| 3,024,013 A | 3/1962 | Rogers |
| 3,113,623 A | 12/1963 | Krueger |
| 3,241,611 A | 3/1966 | Dougan |
| 3,547,193 A | 12/1970 | Gill |
| 3,954,140 A | 5/1976 | Hendrick |
| 4,007,786 A | 2/1977 | Schlinger |
| 4,144,935 A | 3/1979 | Bridges et al. |
| 4,148,359 A | 4/1979 | Laumbach et al. |
| 4,199,025 A | 4/1980 | Carpenter |
| 4,375,302 A | 3/1983 | Kalmar |
| 4,401,162 A | 8/1983 | Osborne |
| 4,444,258 A | 4/1984 | Kalmar |
| 4,570,715 A | 2/1986 | Van Meurs et al. |
| 4,640,352 A | 2/1987 | Van Meurs et al. |
| 4,694,907 A | 9/1987 | Stahl et al. |
| 4,817,711 A | 4/1989 | Jeambey |
| 4,886,118 A | 12/1989 | Van Meurs et al. |
| 5,011,329 A | 4/1991 | Nelson et al. |
| 5,082,055 A | 1/1992 | Hemsath |
| 5,193,934 A | 3/1993 | Johnson |
| 5,236,039 A | 8/1993 | Edelstein et al. |
| 5,255,742 A | 10/1993 | Mikus |
| 5,392,854 A | 2/1995 | Vinegar et al. |
| RE35,696 E | 12/1997 | Mikus |
| 6,019,172 A | 2/2000 | Wellington et al. |
| 6,056,057 A | 5/2000 | Vinegar |
| 6,079,499 A | 6/2000 | Mikus et al. |
| 6,165,632 A | 12/2000 | Blum et al. |
| 6,183,896 B1 | 2/2001 | Horita |
| 6,187,465 B1 | 2/2001 | Galloway |

OTHER PUBLICATIONS

US Patent Application Publication 2002/0011335, "Fuel Cell for Downhole and Subsea Power Systems", Jan. 2002.*

* cited by examiner

Primary Examiner—David Bagnell
Assistant Examiner—Zakiya Walker
(74) Attorney, Agent, or Firm—Rick Martin; Patent Law Offices of Rick Martin, P.C.

(57) ABSTRACT

A fuel cell based subterranean heater for mineral extraction, in situ decontamination, or other applications. The fuel cells are preferably stacked within a casing which is then inserted into a hole bored, or otherwise formed, into the formation to be heated. Conduits within the casing, and preferably formed by adjacent, aligned holes formed through the plates of the individual fuel cells supply fuel and air and extract exhaust gases. An optional manifold is used to span the overburden without applying heat to it directly. The manifold may also function as a heat exchanger between incoming and exhaust gases. Preferably the fuel cell is fueled by gases produced by the formation and also generates electricity which is available for use or export.

10 Claims, 9 Drawing Sheets

APPARATUS AND METHOD FOR HEATING SUBTERRANEAN FORMATIONS USING FUEL CELLS

BACKGROUND OF THE INVENTION

1. Field of the invention

The present invention relates to the field of devices for heating a subterranean formation.

2. Background Information

The utility and desirability of applying heat to subterranean formations are well known. There are numerous applications, including oil production and remediation of contaminated soils. In many instances it is desirable to heat thick underground sections as uniformly, efficiently, and economically as possible. There are vast deposits of hydrocarbons all over the world, including oil shales, tar sands, and oil-bearing diatomites that will yield combustible gases and oil when heated. There are thousands of sites that have been contaminated by pollutants that can be driven out of the soil or decomposed in place by the application of heat. There may be numerous other uses for the application of subterranean heat as well, including, but not limited to: the accelerated digestion of landfills, thawing of permafrost, gasification of coal, production of methane hydrates, and others.

A means for heating subterranean formations was invented by Ljungstrom in 1940, U.S. Pat. No. 2,732,195. Ljungstrom's invention pertained to formations of oil shale and used electrical resistance heaters installed in a pattern of vertical bore holes to heat the formation through thermal conduction. When heat was applied to the oil shale formation the waxy hydrocarbon "kerogen" began to break down to yield fuel gases and shale oil. Heat induced pressures in the formation drove these products into collection wells, where they were recovered. The so-called "Ljungstrom Method" was successfully deployed in Sweden during World War II to help alleviate a critical shortage of liquid fuels in that country. Details regarding the Ljungstrom Method have been widely published in journal articles like "Underground Shale Oil Pyrolysis According to the Ljungstrom Method, " by G. Salomonsson, Swedish Shale Oil Corp., *IVA*, vol. 24, (1953), No. 3, pp. 118–123. "Production of Shale Oil in Sweden," by H. E. Linden, *Producer's Monthly*, July, 1948, pp. 29–34. And others.

Since Ljungstrom, there have been numerous inventions for other types of apparatus and methods to heat subterranean formations. These include: gas fired burners—U.S. Pat. No. 2,902,270; elongated porous combustion tubes—U.S. Pat. No. 3,113,623; catalytic heaters—U.S. Pat. No. 3,804,163; electro-heating with electrodes—U.S. Pat. No. 4,412,585; heating with radio frequency electromagnetic radiation (microwaves)—U.S. Pat. No. 4,320,801; flameless combustors—U.S. Pat. No. 5,255,742; circulation of hot combustion gases—U.S. Pat. No. 6,056,057; and nuclear reactor cooling fluids—U.S. Pat. No. 3,237,689.

Many of the above inventions apply to oil shales, oil sands, coal seams or other hydrocarbon formations. Heating has numerous effects which aid in the recovery of a variety of fossil resources: Heat reduces the viscosity of heavy oils, produces fuel gases through distillation, pressurizes underground formations, and forms fractures due to gas and steam pressure and thermal expansion. According to U.S. Pat. No. 5,297,626: "Production of oil in a thermal conduction process is by pressure drive, vaporization and thermal expansion of oil and water trapped within the pores of the formation rock. Oil migrates through small fractures created by the expansion and vaporization of the oil and water."

One of the great advantages of heating the ground to facilitate resource extraction is the fact that it is a so-called "in-situ" process. In-situ means that the resource ore body is left in place in the ground while the oil, gas, or other desirable products are removed. This has great advantages over mining or other "ex-situ" techniques, which require physical removal of the ore bodies, and extensive processing to separate the desired products from their mineral matrix. Insitu processes minimize capital expenditures and are generally less environmentally disruptive. In-situ processes also tend to be scalable, allowing projects to start small and grow incrementally.

The opposite is frequently true of mining ventures, which can require a minimum size for economical operation. This has especially been the case with hydrocarbon resources like oil shale, where immense mining operations would be required in order to achieve economies of scale that would allow shale oil to be produced at competitive costs. It has been estimated that production of one million barrels of shale oil per day would require mining activity equivalent to all other U.S. mines put together. Building such enormous facilities means taking huge financial risks before the first dollar of revenue can be realized. This fact, together with the environmental complications of such projects, has prevented their being brought to fruition in the past.

In-situ heating of underground formations can also be used to decontaminate polluted soils. U.S. Pat. Nos. 5,318,116 and 5,244,310, for example, disclose methods for decontaminating soils by injecting heat below the surface in order to break down, vaporize, and mobilize pollutants.

All of the previously proposed in-situ methods for applying subterranean heat have suffered from serious disadvantages. For example, those that require inputs of electrical energy, like electrical resistance heaters and microwave electrodes, face serious thermodynamic and economic inefficiencies. According to U.S. Pat. No. 5,297,626: "The high cost of electrical energy is also an impediment to commercial projects using these prior art methods. Conversion of hydrocarbons to electrical energy is typically accomplished at only about 35 percent efficiency and requires a considerable capital investment."

Essentially, electrically powered heaters trade electricity for heat. The electricity, however, must first be produced, usually through combustion of some fuel. Since typical central power plant efficiencies are only 30–35%, this means that every BTU of heat put in the ground by these methods may require 3 BTU of fuel consumed in power plants. The Ljungstrom Method, for example, requires 24 kilowatt hours (kWh) of power for every gallon of oil produced. Producing 24 kWh of electricity in a central power plant might require 254,000 BTU worth of fuel. Since a gallon of oil typically contains 140,000 BTU, it can be seen that the Ljungstrom Method operated at a loss.

The Ljungstrom Method was used briefly in Sweden only because that country had an abundance of cheap hydropower and an acute shortage of liquid transportation fuels. Other electrically powered systems for ground heating are reportedly less demanding of electricity than the Ljungstrom Method, but are still uneconomic. For example, heating of an oil shale formation by microwaves is reported to yield one gallon of oil for every 9.3 kWh of electricity expended. (R. Mallon, *Economics of Shale Oil Production by Radio Frequency Heating*, Report No. UCRL-52942, Lawrence Livermore Laboratory, May 1980, p. 134.) At prevailing rates of $0.05/kwh, this would translate into a cost of $19.50 per barrel for electricity alone. (These calculations do not take into account the production of noncondensable gases, or other co-products that may or may not have economic value.)

Other subterranean heaters in the prior art attempt to address the inefficiencies inherent in electrically driven systems by burning fuels to produce heat directly. Generally heat from combustion is cheaper than heat from electricity. These systems avoid the intermediate step of producing electricity and therefore are thermodynamically superior, but still suffer from economic shortcomings that have thus far prevented their widespread adoption. Inventions of this type include gas-fired heaters, catalytic heaters, and flameless combustors among others.

Numerous inventions for combustion heaters propose to heat formations by circulating hot gases or other fluids from surface heaters. For example, U.S. Pat. No. 6,056,057 proposes to produce a stream of hot gases in a surface burner and to then circulate those gases into the ground through a set of annular tubes cemented into bore holes. U.S. Pat. No. 3,237,689 proposed using a nuclear reactor to heat an oil shale formation. Aside from the obvious difficulties and doubtful economics of using nuclear power to produce oil, this process also required that heat be imparted to the ground through the circulation of a hot working fluid through a heat exchanger. Molten sodium circulating through a coiled pipe was proposed as the preferred embodiment.

U.S. Pat. No. 4,694,907 proposed circulating steam from a turbo-driven electric generator. According to this invention, fuel was to be burned in a surface turbine that powered an electric generator. Then, steam was to be produced from the heat of the exhaust gases as they exited the turbine. This steam was then to be circulated into the ground to heat the desired formation. This invention has the considerable advantage of utilizing a heat source that might otherwise be wasted. This improves the overall thermodynamic efficiency of the heating process considerably.

While such heat circulating systems avoid the inefficiencies of electrical heaters, they nevertheless have considerable problems of their own. One such problem is that the working fluids are necessarily hotter at the top of the formation than at the bottom and therefore do not heat the formation uniformly. Such systems also require large mass flows and correspondingly incur large costs associated with pressurizing and pumping large volumes of fluids. The net result is that, other considerations aside, such systems are probably not feasible except for resources in relatively thin deposits. According to U.S. Pat. No. 6,056,057: "Injection of heat using only combustion gases to depths of greater than about 200 to 400 feet may be relatively expensive."

Numerous other inventions in the art propose a variety of down-hole burners. In these embodiments, combustion gases and air are fed to burners that are positioned in the bore holes; combustion of the fuel takes place underground and the resultant heat warms the formation. A variety of problems have attended each embodiment of the prior art, and a succession of inventions have been made to address these shortcomings. It was found for example that burners with open flames, like those described in U.S. Pat. No. 2,902,270, produce areas of excess heat adjacent to the flame and areas of inadequate heat elsewhere. This results in uneven heating of the formation with poor results. Open flames, which can produce local temperatures of 1650 degrees C., also create uneven stresses and thermal erosion within the burners. These hot spots lead either to limited equipment life or to high expenses for exotic materials.

Various inventions have been proposed to elongate the burn zone to achieve uniform heating. For example, U.S. Pat. No. 3,113,623 proposes the use of an elongated gas-permeable tube to extend the length of the active combustion zone. One problem common to such elongated burners involves the mixing of fuel and air. If the air and fuel are mixed on the surface, there is a very real danger of auto-combustion when the temperature of the mixture rises above a critical point on its way to the burner. This problem limits the use of such elongated burners to thin formations under shallow overburden.

Other heaters have been devised to eliminate flames altogether. For example, U.S. Pat. No. 5,255,742 avoids mixing of fuel and air until they reach the point of desired combustion. Problems of carbon formation are addressed by the addition of steam and/or carbon dioxide to the fuel stream as coke suppressants. In a later embodiment of the invention, U.S. Pat. No. 5,862,858, the addition of a catalyst to the combustor is intended to remove the need for coke suppression. Such flameless combustors apply heat to the ground evenly and can be adapted to formations of considerable thickness and depth.

One of the main problems with combustion heaters of all types is that they must consume an outside source of fuel. This is true even of combustion heaters used to produce combustible vapors from hydrocarbonaceous deposits. Until the formation has been warmed sufficiently to establish production at the collection wells, there is no internal source of fuel, which must therefore be imported. From a practical standpoint this means that a producer must buy natural gas or some other fuel and burn it in the down-hole combustors until production is established. Purchase of this fuel amounts to a significant expense. In resources typical of the art, like oil shales, tar sands, and diatomite oil formations, this expense can continue for as long as two years. If we take, for example, a down-hole burner 500 feet long, producing heat at the rate of 700 BTU per foot per hour, and operating with a thermal efficiency of 90%, then that heater will require fuel at the rate of 390 cubic feet per hour, assuming natural gas at 1000 BTU $ft^3$. At $4 per mcf for natural gas, this would entail a daily fuel cost of over $37. Operating the heater for two years would incur expenses in excess of $27,000. To bring a single square mile of oil shale into production might require 10,000 heaters. When the fuel cost per heater is multiplied by the large number of heaters required, it can be seen that this is a substantial front-end expense—$270 million per square mile—and can represent a significant fraction of overall project costs.

Even after production of combustible gases has been established from a hydrocarbon formation, the cost of fuel for combustion heaters is still significant. Many hydrocarbon formations will yield substantial amounts of combustible gases when heated. Oil shale, for example, can, depending on how it is heated, yield 30 gallons of oil per ton of shale, plus a thousand cubic feet of high BTU gas. This gas can be sent back down the bore holes to fire the burners, but it cannot be taken as "free". Since the gas could be marketed for from $2 to $5 per million BTU, that value, minus transportation and other marketing charges, must be set as the "cost" of the gas.

The high cost of fueling combustion heaters is one of the reasons that this particular method of in-situ resource extraction has not yet achieved widespread adoption.

There is a need for a subterranean heater with greater efficiency in terms of net energy production and reduced energy cost for mineral extraction and other applications.

The heater would preferably consume a gaseous fuel of the type generated by the subterranean formation being heated as a normal by-product of the operation being performed to avoid the need to import fuel.

Ideally, the heater would produce heat uniformly along its length, without risk of auto-combustion and would heat formation at a reduced net cost for fuel.

The present invention incorporates all of these advantages.

BRIEF SUMMARY OF THE INVENTION

The present invention is a subterranean heater composed of fuel cells. In the preferred embodiment, the apparatus comprises a plurality of fuel cells assembled in a vertical stack, with conduits throughout the stack supplying the cells with fuel and air, and removing exhaust gases. Preferably, the fuel cell stack is enclosed in a casing adapted for insertion into a well bore. An electrical connection is provided to the far end (typically bottom) of the stack to allow completion of an electric circuit.

The encased fuel cell stack is inserted into a wellbore, preferably vertically, but potentially horizontally or at some other orientation. Preferably, the encased conduit is cemented into the borehole by a suitably heat conducting grout. Fuel and air are pumped into the stack through the incorporated conduits to the fuel cells. Within the fuel cells, electrochemical reactions take place to produce electricity and heat. The electricity passes out of the stack through an electric circuit. Fuel cells, of the solid oxide type, which are preferred, operate at temperatures in the 800 to 1000 degree Centigrade range. This is also the preferred temperature range for many subterranean heating applications. Heat passes from the fuel cell stack to the underground formation by thermal conduction. Thus, the operating fuel cell stack acts as a down-hole conduction heater.

In the preferred embodiment of the invention, conduits for air, gaseous fuel, and exhaust are formed by aligning holes in plates supporting the fuel cells. Communication for circulation of these gases is provided by channels formed in the surface of the plates connecting the conduits to the fuel cells.

The size and activity of the fuel cells themselves can be modified to tailor the output of thermal energy to the formation being developed. Alternatively, the fuel cells themselves may be standardized, to maximize production efficiency, while the thermal properties of the stack are varied by the insertion of spacers between active fuel cells.

A refinement of the invention may be to include a manifold connecting the fuel cell stack to the surface. This manifold may be insulated to minimize heating of overburden above the resource deposit. Further, the manifold may serve as a heat exchanger between the exhaust gases leaving the fuel cell stack and the incoming streams of fuel and/or air. By this method, the maximum amount of thermal energy is retained within the target formation.

Where the invention is used to produce hydrocarbonaceous resources, it is intended that the volatile gases, produced as the result of heating such deposits, should be used as fuel to power the fuel cells. By this method, the fuel cells will be self sustaining. Since the thermal process produces a fuel stream, and the fuel is first converted to electricity in the fuel cells, the production cycle is therefore being powered by that fraction of total energy that is otherwise usually wasted. The net result is an increase in the overall thermodynamic efficiency of the resource extraction system.

The fuel cell heater does double duty as both a heating element and a power generator, resulting in increased economic efficiency. The present invention overcomes many of the diseconomies of other subterranean heaters by reducing the cost of heat produced by the fuel cells to essentially zero. Although the fuel cells do require fuel, the cost of fuel is offset by the value of the electricity the cells produce.

The present invention combines the advantages of downhole combustion heaters with the advantages of electrical resistance heaters, while eliminating most of the disadvantages typical of subterranean heaters of the prior art. The present invention converts fuel to heat, like combustion heaters, avoiding the inefficiencies of electrical resistance heaters. The present invention produces heat uniformly over the length of the heater, like electrical resistance heaters, while avoiding the hot spots and uneven heating of combustion heaters. The present invention also eliminates the problems associated with mixing fuel and air in flameless combustor heaters by maintaining separation of these gases across the fuel cell electrolyte.

The above and other features and advantages of the present invention will become even clearer from the detailed description of a specific illustrative embodiment thereof, presented below in conjunction with the accompanying drawings.

DETAILED DESCRIPTION OF THE INVENTION

The following discussion focuses on the preferred embodiment of the invention, which is for conductive heating of oil bearing formations for recovery of that oil. However, as will be recognized by those skilled in the art, the disclosed method and apparatus are applicable to a wide variety of situations in which it is desired to heat a subterranean region for any purpose. This includes oil and gas extraction as well as hazardous waste clean-up or remediation.

Glossary

The following is a brief glossary of terms used herein. The supplied definitions are applicable throughout this specification and the claims unless the term is clearly used in another manner.

Channel—feeder passage within a fuel cell connecting an active portion of the cell (cathode, anode, or electrolyte) to a conduit.

Conduit—passageway for air, fuel, or exhaust running lengthwise through the fuel cell stack.

Formation—generally that subterranean region to be heated for whatever purpose. This term encompasses oil bearing formations, landfills, and any other region being heated.

Fuel cell—this term is intended to encompass any device which operates by converting fuel into electricity through an electrochemical reaction. Any of the various technologies (solid oxide, phosphoric acid, molten carbonate, etc.) are considered to be included. The preferred embodiment utilizes solid oxide fuel cells, but the invention should not be considered limited to that technology. Herein, the fuel cell is generally considered to include the various plates which support and route gases to and from the active portion of the fuel cell.

Heater—multiple fuel cells configured to provide heat to a surrounding formation. Generally stacked in a cylindrical arrangement adapted for insertion into a well bore, but other configurations are anticipated.

Segment—a physical subset of a heater, typically comprising multiple fuel cells. Segments are sized for ease of handling and are assembled to form the completed heater.

Wafer—generally the cathode-electrolyte-anode sandwich forming the active portion of the fuel cell.

Preferred Embodiment

The disclosed invention is described below with reference to the accompanying figures in which like reference numbers designate like parts. Generally, numbers in the 200's refer to prior art elements or elements in the surrounding environment while numbers in the 100's refer to elements of the invention.

Overview

The operation of a fuel cell is well known in the art. Generally, a fuel cell converts fuel and oxygen to heat and electricity through an electrochemical reaction involving a cathode, anode, and an electrolyte. In most typical applications fuel cells are used to generate electricity and heat is a waste product. Candidate fuel cells of the planar solid oxide type are described in U.S. Pat. Nos. 6,296,963 and 5,993,986.

In the present invention, the cells are used to generate heat with electricity as a co-product. Part of the heat maintains the fuel cell at operating temperature while the majority is transferred to the surrounding formation, raising its temperature. The electricity produced by the cells is conducted to the surface for use or sale/export.

Different applications of the heater and different formations being heated will have different thermal output requirements. Two general approaches to adapting the output of the heater are anticipated. The first is by altering the surface area of the individual fuel cells. Smaller cells will produce less heat, while larger cells produce more. Selecting different sizes when assembling the heater will result in different thermal output. A second approach is to introduce spacers between individual fuel cells or small groups of fuel cells. This results in lowered average output measured over a length of the heater having both fuel cells and spacers, since the spacers contribute no heat. Each of these approaches has advantages which will be discussed below.

Figure 14:
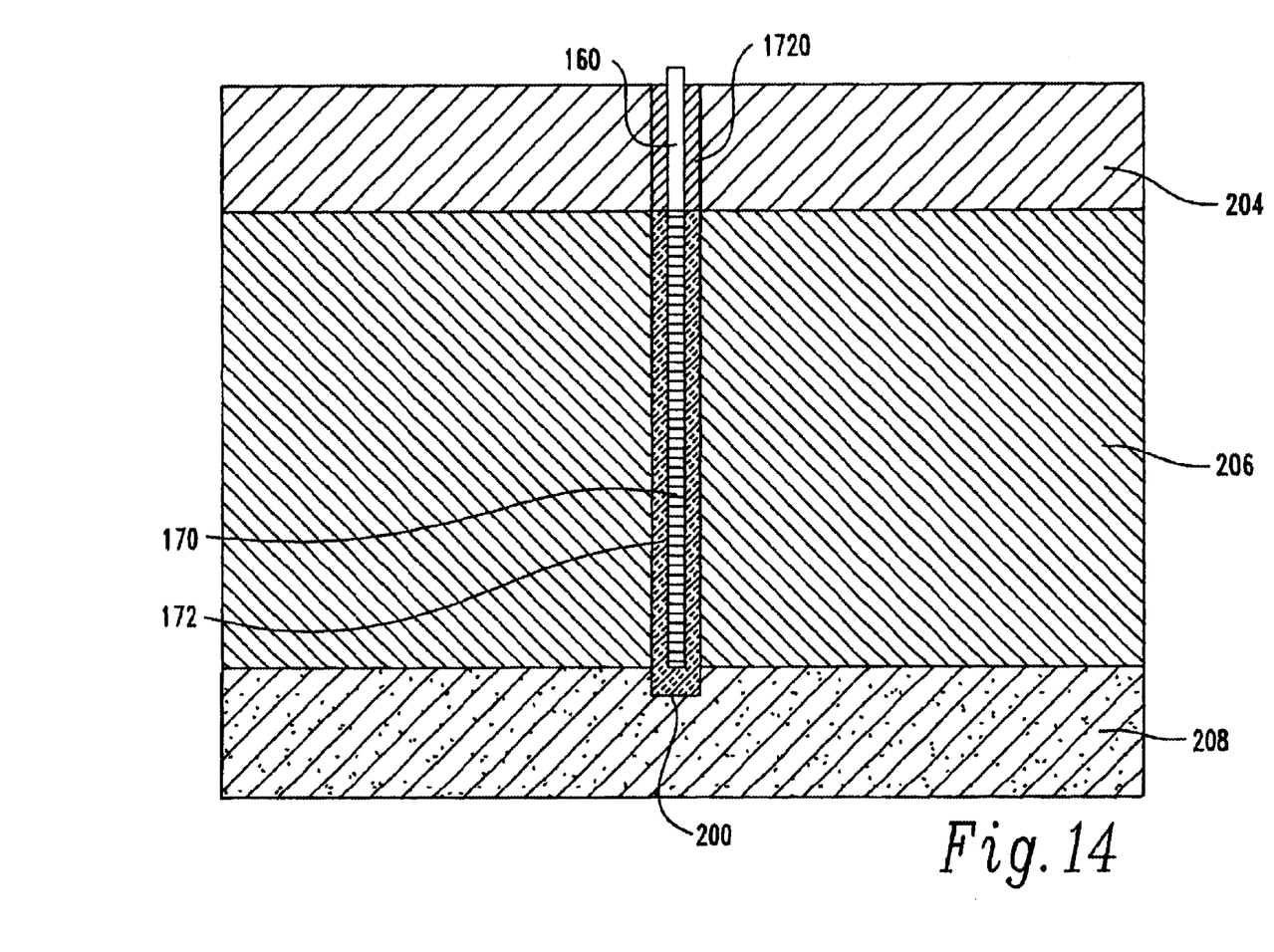
FIG. 14 illustrates the inventive heater inserted in a subterranean formation.

In the preferred embodiment, some number of fuel cells will be assembled into a heater segment, in a workshop or factory environment. These segments will then be transported to the site where the heater is to be installed and will be joined together to form the complete heater, FIG. 14, 170, as they are placed in the bore hole, 200. Preferably, a high temperature, thermally conductive grout, 172, is injected between the heater segments and the bore wall to improve heater transfer to the formation, 206. The length of the segments is not critical to the invention, and is selected primarily to simplify installation of the heater by using conventional mobile drilling rigs. In the preferred embodiment, segments are between 10 and 20 feet long. If desired, a single continuous heater could also be constructed consistent with the teachings of this invention.

Where there is an overburden, 204, between the surface and the formation to be heated (typical) a separate exhaust manifold, 160, may be used to span the overburden. This way, heat is not wasted by being applied directly to the overburden. Further, the design and installation of the manifold is intended to minimize heat transfer to the overburden. The manifold itself (or the casing thereof) may be insulated and/or an insulating grout, 1720, may be used between the manifold and the bore wall. If desired, the diameter of the casing can be increased through this section, to allow the addition of a layer of insulation inside the casing. As with the heater, the manifold may be manufactured in segments and joined on site. If desired, the well bore within the overburden can be overdrilled, to a diameter larger than that of the manifold, thereby creating additional annular space around the casing through the overburden. This increases the thickness of the insulating grout around the manifold. A candidate material for use as an insulating grout, 1720, is a concrete mix containing some volume of a heat resistant insulator, such as vermiculite. U.S. Pat. No. 6,290,769 discloses a suitable material. While the bore hole may extend somewhat into the underburden, 208, preferably the heater stops at the bottom of the formation.

Further, the manifold preferably operates as a heat exchanger, preheating the fuel and air, and cooling the exhaust gases. If desired, the exhaust manifold may be supplemented, or replaced, by a discrete heat exchanger on the surface.

Figure 13:
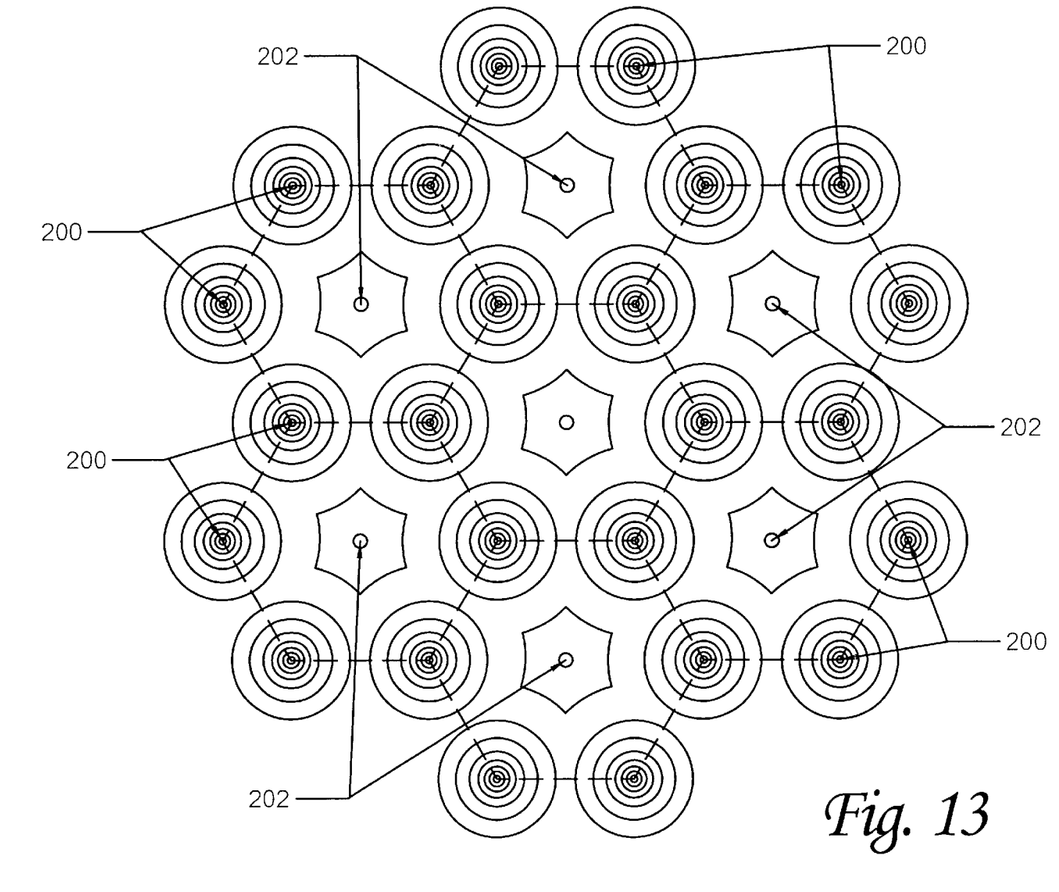
FIG. 13 illustrates one possible layout of heater bores and production wells where the inventive heater is used for mineral extraction.

Preferably, the heaters would be distributed throughout the formation, likely in a hexagonal pattern as illustrated in FIG. 13, to provide relatively uniform heating of the formation. In the case of oil extraction, the heater bores, 200, would be interspersed with the production wells, 202, as shown. The concentric circles surrounding the heater bores represent isotherms. While vertical well bores would be the most common, clearly other orientations, such as horizontal, are possible.

Structure

Figures 1, 2:
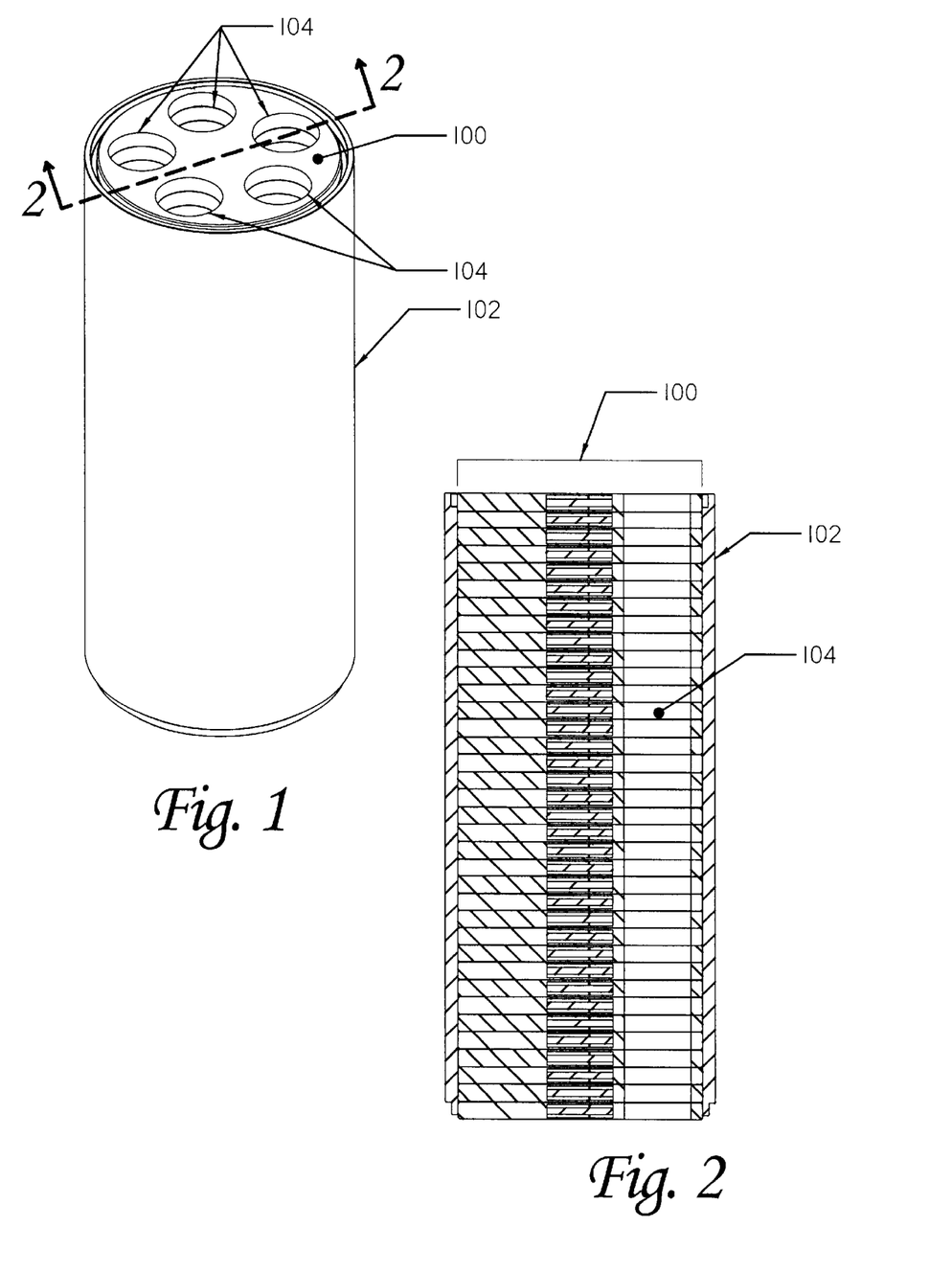
FIG. 1 illustrates a heater segment incorporating the first embodiment of fuel cell.
FIG. 2 is a cross section through the heater segment of FIG. 1
Figure 3:
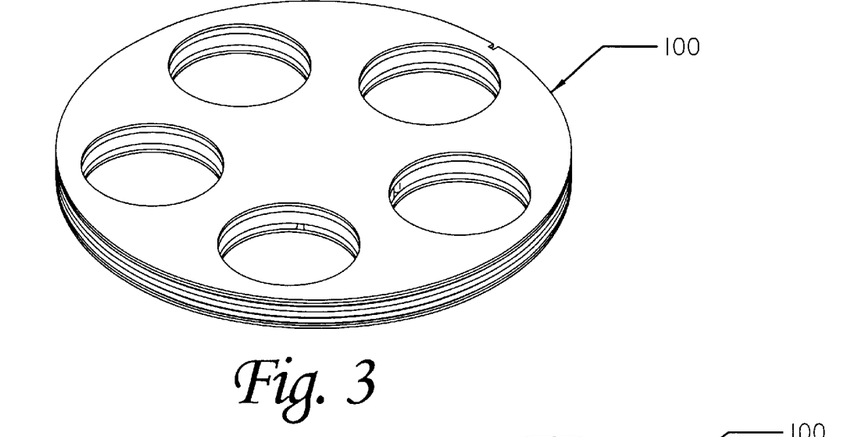
FIG. 3 illustrates a single fuel cell according to the first embodiment.
Figures 4, 5:
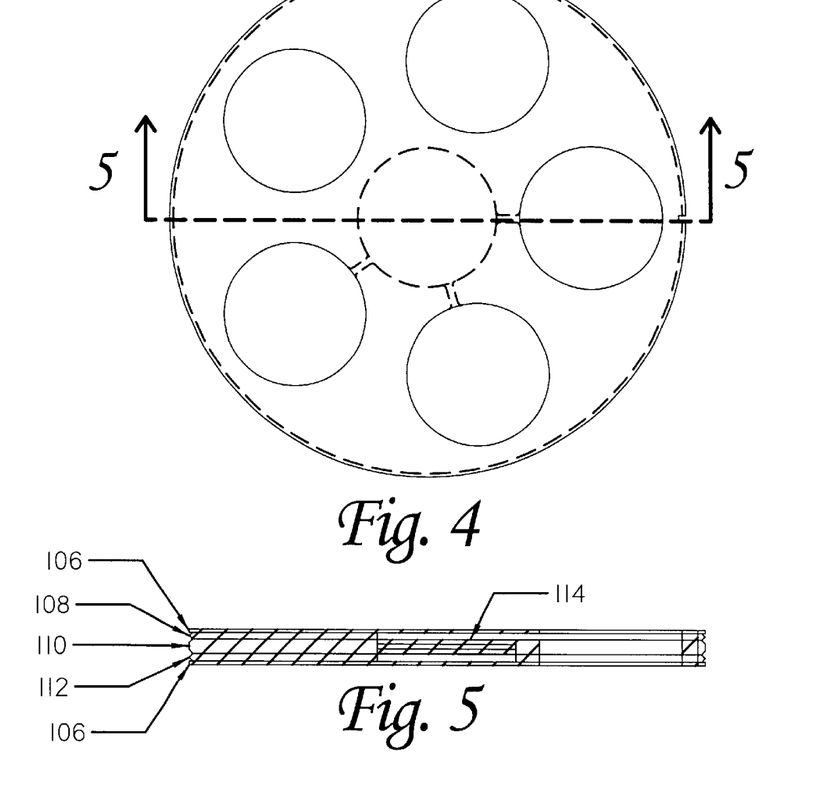
FIG. 4 is a top view of the fuel cell of FIG. 3.
FIG. 5 is a cross section through the fuel cell of FIG. 4.
Figure 6:
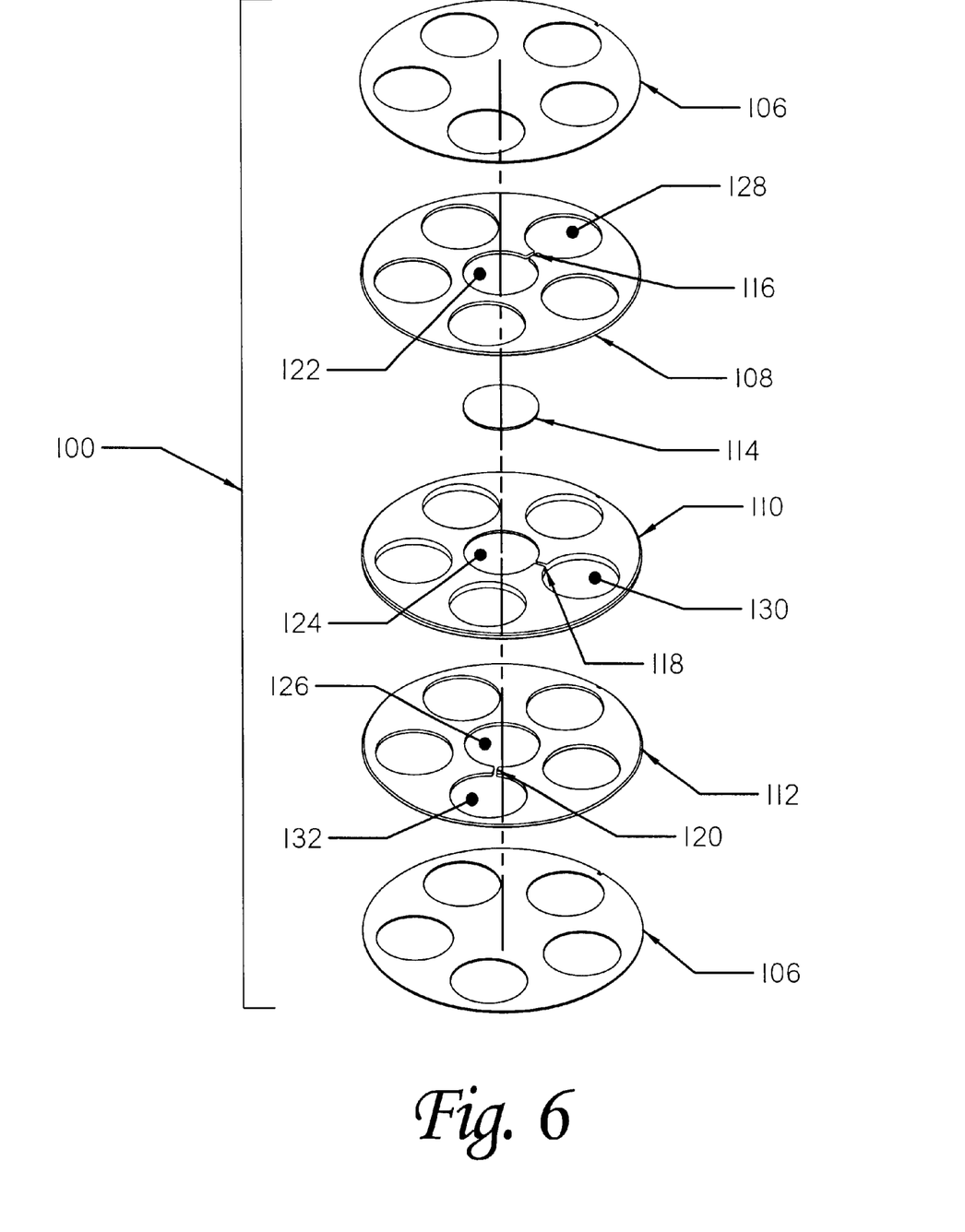
FIG. 6 is an exploded view of the fuel cell of FIG. 4.

FIGS. 1 and 2 illustrate the general configuration of fuel cells, 100, within a heater segment. Casing, 102, encloses and aligns the cells, 100, and forms a seal around the cells. The cells are arranged in a continuous stack, each cell in contact with those immediately adjacent. This provides an electrical connection between the cells and a physical coupling which provides support and enables the formation of the conduits, 104. Each cell has a plurality of openings formed therethrough, which, when aligned, combine to form the conduits which are continuous through the stack.

FIGS. 1 and 2 illustrate a first embodiment of the inventive heater in which the size (and thus the thermal output) of the cell has been adapted to match the requirements for the heater. A continuous stack of the cells provides the desired thermal output per linear foot. A third embodiment, discussed below, utilizes spacers to adapt the thermal output.

Each of the cells is of relatively conventional planar design and their manufacture is well known in the art. Generally, the cells are assembled from layers, each composed of the appropriate material, with the active electrode-electrolyte wafer located in the center. FIGS. 3–6 illustrate one embodiment in which stamped sheets, 106–112, form the structure of the cell with the active portion, 114, fitted in the central opening. Plates 106, serve as end caps, sealing the fuel cell. Where a continuous stack is being formed, there may only be one end cap between each cell, serving as the top of one and the bottom of the other. Plate, 108, supplies fuel to the cell, with channel, 116, connecting conduit, 128, to plenum, 122, which makes the fuel available to the anode of the active wafer. Similarly, plate, 112, supplies air (oxygen) to the cathode side via channel, 120, from conduit, 132, to plenum, 126. Note that the plenums are sized to provide just sufficient clearance over the face of the electrodes to assure proper gas flow. Plate, 110, serves to mount the active wafer portion of the cell and also serves to route the exhaust products to conduit, 130, via channel, 118.

Figure 7A:
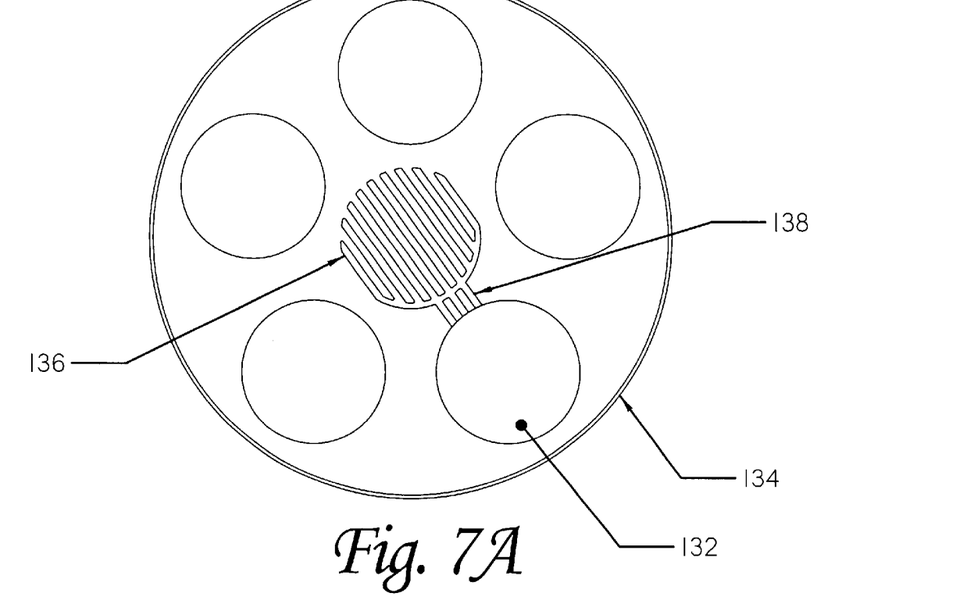
FIG. 7A illustrates the upper surface of the combined fuel/air plate used in a second embodiment of fuel cell.
Figure 7B:
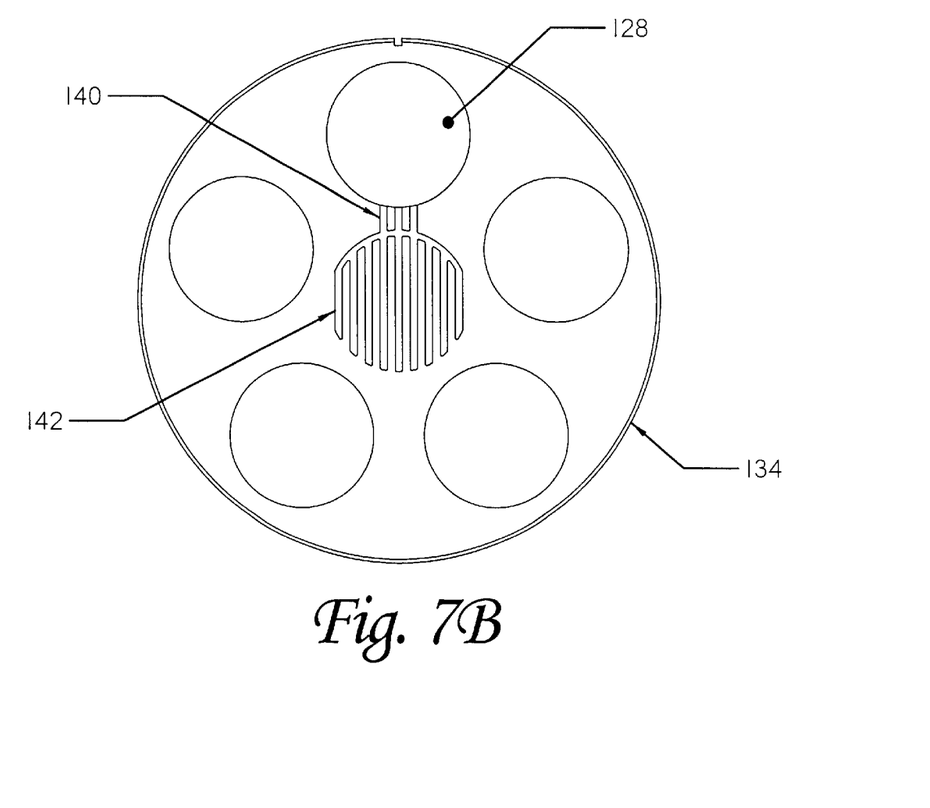
FIG. 7B illustrate the lower surface of the plate of FIG. 7A.
Figure 8:
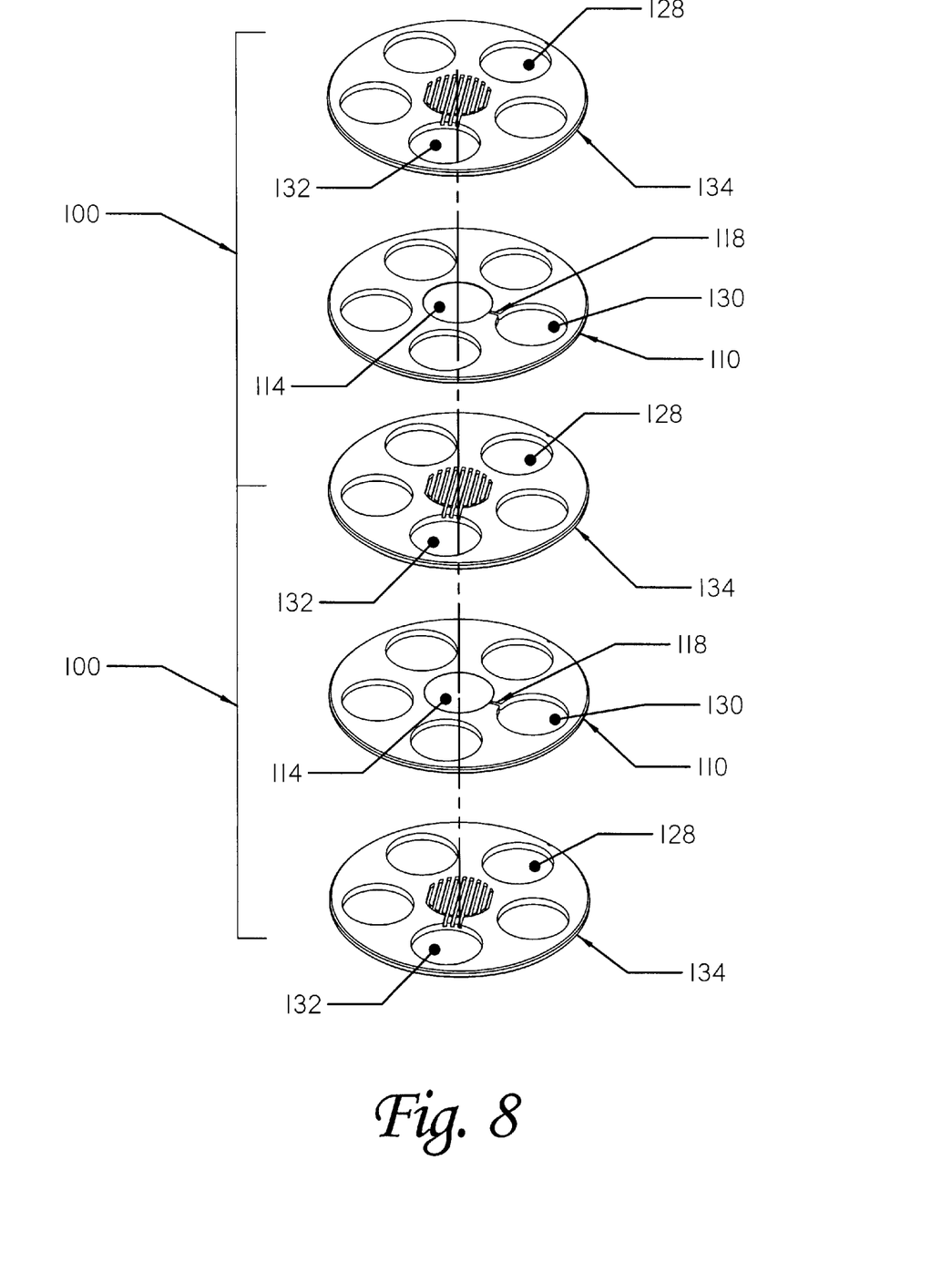
FIG. 8 is an exploded view of two adjacent fuel cells according to the second embodiment, using the plate of FIG. 7A.

FIGS. 7–8 illustrate a second, functionally equivalent, embodiment of the fuel cell. Note that in FIG. 8, the ceramic elements, 114, of the cells are illustrated in position within plates, 110. In this embodiment, the channels are formed by milling or etching passages, 136 and 142 into the faces of the plate, 134, so that they are open only to one side. The upper surface, shown in FIG. 7A, has passages 136 connected to conduit 132 via channels 138, which supply air to the cathode. The lower surface, shown in FIG. 7B has passages, 142 and channels, 140, supplying fuel from conduit 128 to the anode. Where a plate is at the end of a heater segment, it may be formed with only one set of passages or may contain both sets, providing for mating with the end fuel cell of the adjacent segment. A fuel cell of this general structure is disclosed in U.S. Pat. No. 4,950,562 to Yoshida et al.

It should be noted that the method of constructing the individual fuel cells is not critical to the present invention. Either of the above techniques, as well as others not discussed, would be effective. While the figures illustrate the preferred fuel cell configuration, which utilizes a circular electrode-electrolyte wafer, this shape is not critical. This shape is useful in optimizing and simplifying the layout of the conduits and channels (especially with a circular casing), as well as thermal transfer to the environment, but other shapes are clearly applicable. It should also be noted that while the preferred embodiment uses Solid Oxide Fuel Cells (SOFC), other types of fuel cells are applicable.

In the preferred embodiment, a plurality of conduits are provided through each fuel cell, and thus through the stack, even though each cell only needs three conduits: air; fuel; and exhaust. Because of the significant length of the completed heater and the large total number of fuel cells, a significant gas flow must be provided for each of the three gas types. This is achieved by providing multiple conduits for one or more of the gas types and balancing the number of fuel cells attached to each. In the above illustrated configuration, there are two.each of air and exhaust and only one of fuel. In the alternative configuration discussed below, there are also plural fuel conduits. The relative number of conduits is not critical and can be adjusted as desired to optimize desired characteristics, such as pressure and velocity, of the various gases as is well known in the art. In the preferred embodiment, a fuel consumption rate of approximately 0.05 cubic foot per hour per cell is anticipated with corresponding rates for air and exhaust. An alternative configuration is to provide connections from each cell to a plurality of one or more types of conduits (i.e. two or more air conduits). This approach would provide a level of redundancy in case one of the conduits is compromised. It is also contemplated that the conduits may be formed within the casing and connections provided between the fuel cells and the conduits in.the casing.

The above embodiments offer an advantage over the third embodiment discussed below in that they provide substantially more internal volume within the fuel cell stack for the movement of fuel, air, and exhaust gases through the stack, the height of which may be 500 feet or more. For example, each fuel conduit running the full length of the stack could have a diameter of two inches. The gas flow rate might typically be 777 cubic feet per hour to supply the stack with sufficient fuel. Such a conduit would allow the gas, at standard atmospheric pressure, to flow at an average speed of 589 feet per minute, or around 7 miles per hour. If the pressure is increased in the fuel conduit, the flow rate can be reduced further. The various plates may be made of ceramic, metal, composites, or other materials. Primary considerations include resistance to corrosion or other reaction with the fuel, air, and exhaust gases; conductivity; thermal expansion; and strength.

Referring again to FIGS. 1 and 2, the casing, 102, is primarily a structural element which supports, aligns, protects and seals the fuel cells. Preferably the casing is divided into lengths matching that of the heater segments. The ends of the casing are adapted to interconnect so that the segments can be assembled end-to-end to form the completed heater of desired length. The interconnection mechanism may be threads, lugs, bolts, pins, welding, adhesive, or any other appropriate technique. The main criteria are sufficient strength and proper radial alignment so that the conduits mate properly. Note that the illustrated stepped shoulder and groove arrangement is only one method and is not required. In addition to having sufficient strength, the casing must be thermally conductive, to transmit the heat from the fuel cells to the formation (typically via the surrounding grout). The casing must also be either electrically insulating, or at least partially insulated from the fuel cells. While it could be used as one portion of the electrical interconnection of the fuel cells, it can not be electrically connected to both the cathode and anode of the same cell. It is also contemplated that the casing could be formed integrally with the fuel cells whereby the complete, full length casing is formed as the fuel cells are stacked and interconnected.

Figure 9:
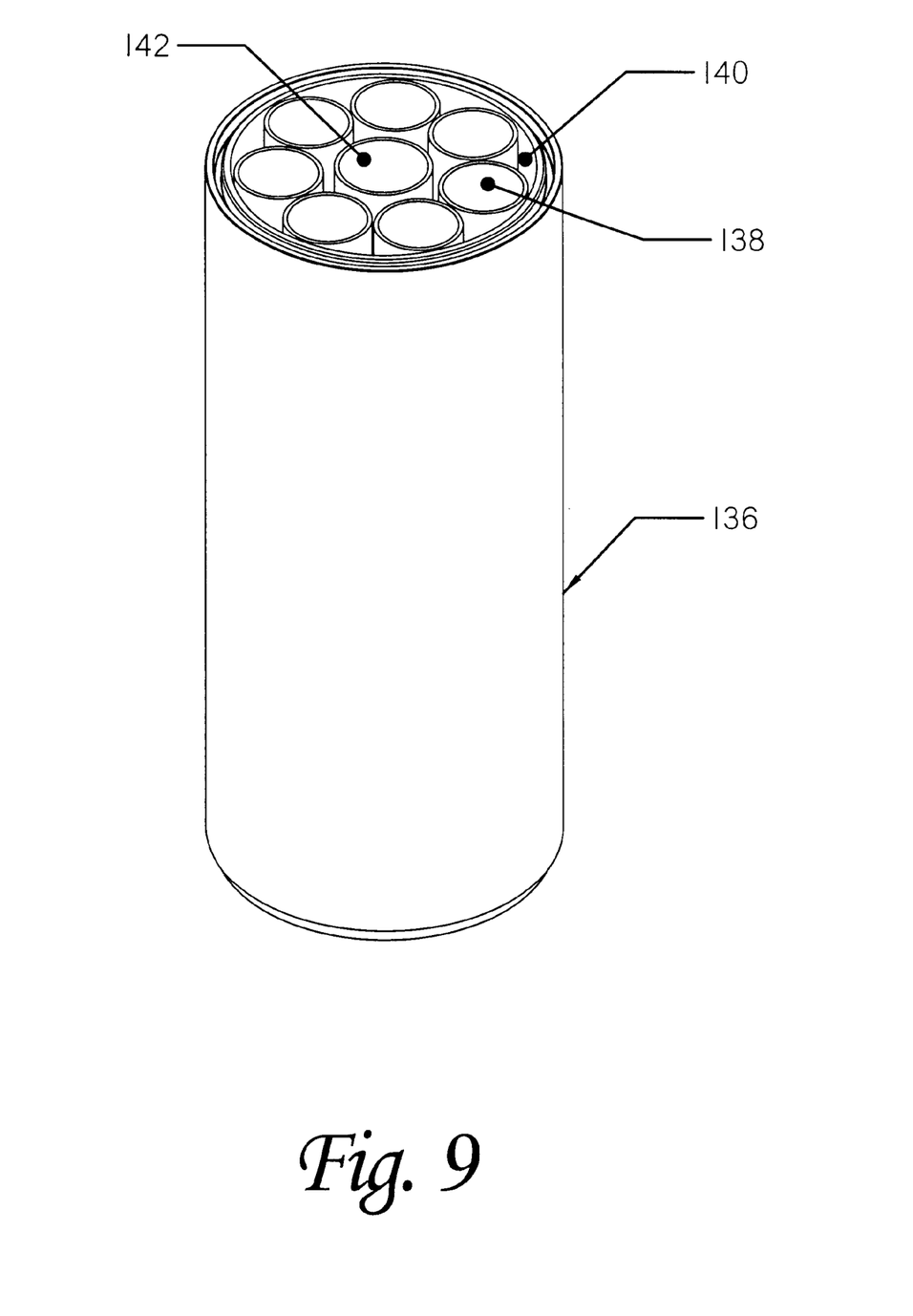
FIG. 9 illustrates an exhaust manifold.

Fuel cells are electrical devices, sometimes described as analogous to batteries, with current flow from one end of the fuel cell stack to the other due to the voltage potential established by the movement of electrons within the cells in the stack. As such, an electrical connection must be provided to each end of the fuel cell stack so as to form a complete circuit (through a load). The first connection, to the top of the stack is relatively simple, and can be made when the heater is complete (or at least prior to attaching the exhaust manifold). A second, more troublesome, connection must be provided to the bottom of the stack. As such, an insulated conductor must be provided which runs the full length of the heater. In the preferred embodiment, the conductor is run along the outside of the casing or wrapped around the casing. This has the advantage of not consuming internal volume within the heater and can be added to the heater in the field, fed into the bore along with the heater. One alternative is to route the conductor within the heater, such as through one of the conduits formed through the fuel cells. This helps protect the conductor, but complicates the field assembly process and consumes potentially valuable volume within the heater. Another alternative is to use the casing itself as the conductor, assuming that it is made of a conductive material and properly insulated from the fuel cells.

Where the heater is used in a formation with an overburden above the formation, an exhaust manifold will preferably be used to connect the heater to the surface. FIG. 9 illustrates a section of manifold, 160. Any configuration of conduits could be used, but the preferred layout is illustrated. Peripheral conduits, 168, carry exhaust gases. Central conduit, 162, carries fuel. The remaining space, 164, between the conduits, carries air. This allows the manifold to function as a heat exchanger, transferring heat from the exhaust to the air and then to the fuel. Ideally, the exhaust gases will arrive at the surface at ambient temperature and the fuel and air will arrive at the fuel cells at operating temperature. The amount of heat transferred to the overburden from the exhaust manifold should be minimized. It is anticipated that some type of internal bracing will be used within the manifold to support the various conduits. This may be continuous webbing; connectors; spaced apart braces; or any other suitable arrangement. The manifold may be a single piece, or assembled from separate components and contained within a casing in a manner similar to that of the heater segments. The exhaust manifold is preferably manufactured in lengths comparable to completed heater segments. Where the configuration of conduits within the exhaust manifold does not match the configuration within the heater segments, an adapter may be provided to mate the exhaust manifold conduits to those in the first heater segment. As with the heater segments, the electrical conductor may be routed either internally or externally.

Operation

The inventive heater can be used with a variety of subterranean formations including landfills and mineral deposits. Preferably, it is used with a formation which produces a gaseous fuel suitable for use by the fuel cells in sufficient volume to supply the operational needs of all of the heaters used in the formation. While not a requirement, this feature increases the desirability of the heater by making it self-sustaining. Since the fuel cells also supply electricity, a remote operation can be entirely self sufficient in terms of energy needs. The heater is equally applicable to formations which do not produce a gaseous fuel when heated. Where the formation being heated is a landfill, methane production would typically be anticipated, with the methane used for the fuel cells. Where the formation is a mineral body, various gaseous products would be anticipated. Oil shale can be used as an example. When heated to temperatures in excess of 300 degrees C., oil shales like those found in the Piceance Creek Basin of Western Colorado, produce considerable volumes of non-condensable gases; 800 cubic feet of gas per ton of shale heated being a typical value. These gases are primarily hydrogen and methane with some volatile hydrocarbons. Such gases are suitable fuels for some fuel cells, including the preferred SOFC cells discussed above.

A number of alternative modes of operation exist for the inventive heater. Where no need exists for the generated electricity and especially where export or sale is not feasible or not desired, the electrical output of the fuel cells could potentially be used to power conventional electrical resistance heaters supplementing the fuel cell heaters in heating the formation. The exhaust gases produced by the fuel cells may also be used, especially where the overburden is too thin to allow complete heat transfer to the air and fuel. In this situation, the above exhaust manifold may be replaced with an insulated configuration intended to preserve the thermal energy of the exhaust gases. One approach is to use the exhaust gases for co-generation of electricity. Another is to re-inject the exhaust gases into the formation at another location to provide supplemental heating of the formation.

Alternative Embodiments

The following discussion presents alternative embodiments which offer various advantages in structure or function without departing from the principles of the invention.

Figures 10, 11, 12:
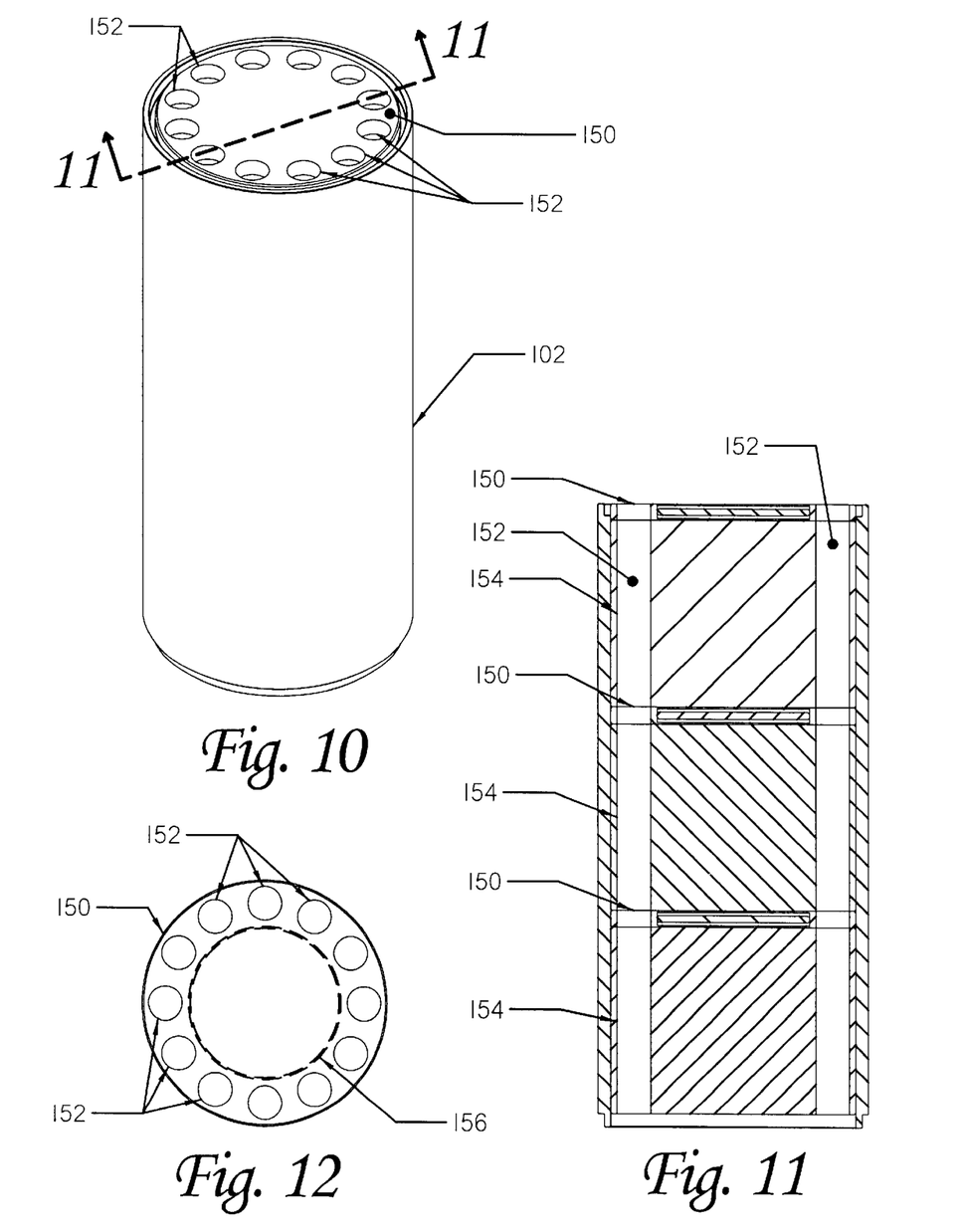
FIG. 10 illustrates a heater segment incorporating a third embodiment of fuel cell.
FIG. 11 is a cross section through the heater segment of FIG. 10.
FIG. 12 is a top view of a single fuel cell according to the third embodiment.

FIGS. 10–12 illustrate a third embodiment of the inventive heater. An arrangement of stacked fuel cells, 150, within a casing, 102, is used, which is similar to that of the first embodiment. However, spacers, 154, are placed between the fuel cells to adapt the thermal output of the heater to the thermal requirements of the formation. The fuel cells incorporate a larger active component, 156, which generates more heat. The fuel cells are then spaced apart to achieve the desired average thermal output per linear foot of heater. A larger number of smaller conduits, 152, are used to accommodate the increased active component size. The reduced cross sectional area (and thus capacity) of the conduits, relative to the first embodiment, may be a detriment where long heater stacks are used. Heater stacks of 500 feet or more are anticipated. An advantage to this approach is that stock fuel cell sizes may be readily adapted to a variety of applications by simply adjusting the length of the spacers. This may be achieved by manufacturing, or cutting, them to length or by assembling a spacer from combinations of various shorter length segments. They may even be built up from the same plates used to mount the fuel cells. The spacers must structurally support and position the fuel cells within the casing and must provide sealed gaseous communication between the conduits of the adjacent fuel cells. The spacers can be metal, composite, or other suitable material that matches the cells themselves in their resistance to heat and corrosion and exhibit similar coefficients of expansion, etc.

In the preferred embodiment, individual fuel cells are spaced apart by the spacers. If preferred, small stacks of fuel cells could be configured contiguously and then the stacks interleaved with spacers. This might offer advantages such as higher voltages available to traverse the spacer.

Sample Application

One example of a suitable resource for mineral extraction is an oil shale formation of the type found in the Piceance Creek Basin of Western Colorado. This type of formation will typically absorb up to 700 BTU per hour per running foot of well bore at a diameter of eight inches. For purposes of the following discussion a power density of 1.61 watts per square inch for the fuel cells and an efficiency of 40% in converting fuel to electricity (or 60% of the fuel going to heat), will be assumed.

The fuel cells disclosed in the first embodiment above have a wafer diameter of approximately 2 inches and an area of 3.14 square inches. At the assumed power density and size, each fuel cell will produce just over 5 watts/hour of electricity and 26 BTU/hour of thermal energy. The target output of 700 BTU/hr/ft will require approximately 27 fuel cells per linear foot. (Assuming 100% transfer to the deposit.) This implies a thickness of approximately 0.44 in. per cell which is readily achievable.

Of course, different values for thermal output desired, power density and efficiency of the fuel cells, etc. will result in different desired fuel cell size and/or spacing.

The relative thermodynamic and economic advantages of the present invention can be clearly illustrated by contrasting the results of an example application using electrical resistance heaters.

In the example application, the target formation to be heated is an oil shale formation 500 feet thick, averaging 25 gallons of oil per ton. The formation is heated at the rate of 700 BTU/foot/hour. Using electrical resistance heaters would require that they be operated at a power output of approximately 206 watts per foot. Therefore, a 500 foot electrical resistance heater would consume power at the rate of 103 kilowatt hours (kwh) per hour, or 2,472 kwh per day. Producing that amount of power in a central power plant would require 25.5 million BTU worth of fuel.

Total thermal input to the oil shale formation from each heater is 8.4 million BTU per day. This is sufficient heat to pyrolyze 25.5 tons of oil shale, producing 541 gallons of oil and 20,600 cubic feet of combustible gas. The gas has a heating value of 1,000 BTU per cubic foot. The central power plant will therefor consume the energy equivalent of all the combustible gases produced, pus an additional 4.9 million BTU. The net product yield of the electrical resistance heater is therefor 506 gallons of oil, or 12 barrels, with a net energy content of 70.8 million BTU.

If a fuel cell heater, as in the present invention, is used in the sample application instead of an electrical resistance heater, the net energy production is markedly greater. The 500 foot fuel cell stack will require 14 million BTU worth of fuel per day. In return for this input, each fuel cell stack will produce 541 gallons of oil, 20,600 cubic feet of gas, and 1,640 kwh of electricity. The fuel cells will consume 14,000 cubic feet of gas, leaving a gas surplus of 6,600 cubic feet. The total energy output from the fuel cell heater is 40% greater than net energy produced by an electric resistance heater. In terms of economic performance, the fuel cell heater will produce 43% more gross revenue than a comparable electric resistance heater.

If fuel cell heaters are compared to gas fired combustion heaters in an application that does not necessarily produce a return fuel stream, the relative benefits of the fuel cell heater can also be seen. If, for example, a gas fired heater were used to heat a 100 foot interval of contaminated soil at a rate of 1000 BTU/foot/hour, the heater would require a fuel input of 2.4 million BTU per day. If natural gas were the fuel, this would require the purchase of 2400 cubic feet per heater per day, at a cost of $9.60 per day. By contrast, a fuel cell heater, applying the same amount of thermal energy to the ground at the same rate, would require 4000 cubic feet of gas per heater per day at a cost of $16.00. However, the fuel cell heater will produce 470 kwh of electric power, worth $23.50.

Therefore, it can be clearly seen that the fuel cell heater more than offsets the cost of the fuel needed to heat a formation. In essence, fuel cell heaters can eliminate the energy cost of heating subterranean formations. This feature will open up large numbers of subterranean resources to the economic application of heat.

While the preferred form of the invention has been disclosed above, alternative methods of practicing the invention are readily apparent to the skilled practitioner. The above description of the preferred embodiment is intended to be illustrative only and not to limit the scope of the invention.

I claim:

1. A heating device for heating a subterranean formation, said heating device comprising plural connected segments, at least one of said segments being a heater segment comprising:
   a plurality of fuel cells;
   a plurality of conduits, each conduit being in gaseous communication with at least one of said fuel cells; and
   wherein at least one of said segments is a manifold comprising conduits but no fuel cells.

2. The heating device of claim 1 wherein at least one of said manifold conduits conducts relatively warmer gas away from said fuel cells and at least one of said conduits conducts relatively cooler gas towards said fuel cells and wherein said manifold is adapted to transfer heat from said warmer gas to said cooler gas.

3. The heating device of claim 1 wherein said manifold comprises thermal insulation to inhibit transfer of heat from said manifold to the surrounding environment.

4. A method of heating a subterranean formation, the method comprising the steps of:
   forming a hole into said formation;
   inserting into said hole a heater comprising a casing and plural fuel cells contained within said casing;
   operating said fuel cells so as to produce heat and electricity;
   wherein said formation, when heated, generates a gaseous product, and wherein said gaseous product is provided to and used by said fuel cells as fuel; and
   wherein at least after an initial start-up period, said fuel cells use fuel from no source other than the gaseous product generated by the formation.

5. The heating method of claim 4 wherein said casing has an outside diameter and said hole has an inside diameter at least somewhat greater than said casing outside diameter thereby defining therebetween a substantially annular gap and said method further comprises the step of filling said gap with a thermally conductive substance.

6. A method of heating a subterranean formation, the method comprising the steps of:
   forming a hole into said formation;
   inserting into said hole a heater comprising a casing and plural fuel cells contained within said casing;
   operating said fuel cells so as to produce heat and electricity; and
   heating said formation at a specified rate per heater segment wherein said heater segment is adapted to produce a thermal output substantially equal to that specified for the formation.

7. The heating method of claim 6 wherein said heater segment would have greater than desired combined thermal output of said fuel cells were configured continuously within said segment and said adaptation is achieved by interleaving spacers within said fuel cells.

8. The heating method of claim 6 wherein each of said fuel cells has a thickness and an active component surface area and wherein said adaptation is achieved by reducing said surface area in proportion to said thickness whereby said fuel cells when arranged continuously produce a combined thermal output substantially equal to that specified.

9. The heating method of claim 6 further comprising inserting additional electrically powered heaters into the formation and using the electrical output of at least some of said fuel cells to power said electrically powered heaters.

10. The heating method of claim 6 wherein said fuel cells generate a relatively warm exhaust gas and wherein said method further comprises collecting said exhaust gas and using it to heat the formation.

* * * * *